(12) United States Patent
de Souza et al.

(10) Patent No.: US 10,089,640 B2
(45) Date of Patent: Oct. 2, 2018

(54) METHODS AND SYSTEMS FOR INTERPRETABLE USER BEHAVIOR PROFILING IN OFF-STREET PARKING

(71) Applicant: Xerox Corporation, Norwalk, CT (US)

(72) Inventors: Cesar Roberto de Souza, Grenoble (FR); Boris Chidlovskii, Meylan (FR); Frederic Roulland, Le Versoud (FR); Luis Rafael Ulloa Paredes, Meylan (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 699 days.

(21) Appl. No.: 14/632,207

(22) Filed: Feb. 26, 2015

(65) Prior Publication Data
US 2016/0253681 A1 Sep. 1, 2016

(51) Int. Cl.
| | |
|---|---|
| G07B 15/00 | (2011.01) |
| G07B 15/02 | (2011.01) |
| G06Q 30/02 | (2012.01) |
| G06F 17/30 | (2006.01) |

(52) U.S. Cl.
CPC ... *G06Q 30/0201* (2013.01); *G06F 17/30539* (2013.01); *G06F 17/30572* (2013.01)

(58) Field of Classification Search
None
See application file for complete search history.

(56) References Cited

U.S. PATENT DOCUMENTS

| | | | |
|---|---|---|---|
| 6,340,935 B1 * | 1/2002 | Hall | G07B 15/04 340/905 |
| 8,502,698 B2 * | 8/2013 | Chen | G08G 1/144 340/5.2 |
| 9,672,434 B2 * | 6/2017 | Wu | G06K 9/00812 |
| 2004/0068433 A1 * | 4/2004 | Chatterjee | G06Q 20/127 705/13 |
| 2004/0249848 A1 * | 12/2004 | Carlbom | G06F 17/30017 |
| 2005/0102379 A1 * | 5/2005 | Su | H04L 69/329 709/219 |

(Continued)

OTHER PUBLICATIONS

Arthur, D. et al., "k-means++: The Advantages of Careful Seeding," SODA '07 Proceedings of the eighteenth annual ACM-SIAM symposium on Discrete algorithms, pp. 1027-1035.

(Continued)

*Primary Examiner* — Fateh M Obaid
(74) *Attorney, Agent, or Firm* — Kermit D. Lopez; Luis M. Ortiz; Ortiz & Lopez, PLLC

(57) ABSTRACT

Methods and systems for interpretable user behavior profiling in off-street parking applications. To render user profiles easy to interpret by decision makers, the semi-automatic discovery and tagging of user profiles can be implemented. Transaction data from one or more (and geographically close) off-street parking installations can be implemented. An analysis of spatio-temporal behavioral patterns can be implemented based on representation of any parking episode by a set of heterogeneous features, the use of clustering methods for automatic pattern discovery, an assessment of obtained clusters, semi-automatic identification/tagging of space-temporal patterns, and a user-friendly interpretation of obtained patterns.

19 Claims, 14 Drawing Sheets

(56) References Cited

U.S. PATENT DOCUMENTS

| | | | |
|---|---|---|---|
| 2006/0162267 A1* | 7/2006 | Van Croonenborgh | E04H 6/287 52/236.3 |
| 2006/0262857 A1* | 11/2006 | Iwasaki | G06K 9/00348 375/240.19 |
| 2009/0153661 A1* | 6/2009 | Cheng | G06K 9/00771 348/143 |
| 2011/0317009 A1* | 12/2011 | Kumaraswamy | G06K 9/00744 348/143 |
| 2012/0296560 A1* | 11/2012 | Zheng | G08G 1/0129 701/119 |
| 2014/0176348 A1* | 6/2014 | Acker, Jr. | G08G 1/144 340/932.2 |

OTHER PUBLICATIONS

Ciriza, V., "Public Transportation Analytics," (2012) Retrieved from XRCE Grenoble: http://www.xrce.xerox.com/content/download/21474/155201/file/Public_Transportation_Analytics.pdf, 9 pages.

Dunn, J. C., "A Fuxxy Relative of the ISODATA Process and Its Use in Detecting Compact Well-Separated Clusters," Journal of Byernetics (1974) 3(3):32-57.

Eubank, R. L. et al, "Curve fitting by polynomial-trigonometric regression," Biometrika (1990) 77(1):1-9.

Pieterson, W. et al., "The Opportunities and Barriers of User Profiling in the Public Sector," Electronic Government: 4th International Conference, EGOV 2005, Copenhagen, Denmark, Aug. 22-26, Proceedings, pp. 269-280.

Revelle, W., "An introduction to Psychometric Theory with applications in R," Department of Psychology, Northwestern University, Evanston, Illinois, Feb. 2013, 70 pages.

Rousseeuw, P. J., "Silhouettes: a graphical aid to the interpretation and validation of cluster analysis," Journal of Computational and Applied Mathematics (1987) 20:53-65.

Soehodho, S., "Predicting the Probability of Parking Vehicle Based on Dynamic Simulation," The Journal of the Eastern Asia Society for Transportation Studies (1999) 3(3):233-245.

Speechley, J. et al., "Profile of Bushy and Richmond Parks Car Park Users: Report of Findings," (2010) 111 pages.

Dieussaert, K. et al., "SUSTAPARK: An Agent-based Model for Simulating Parking Search," 12th AGILE International Conference on Geographic Information Science (2009) Leibniz Universitat Hannover, Germany, pp. 1-11.

Sugar, C. A. et al., "Finding the number of clusters in a data set: An information theoretic approach," Journal of the American Statistical Association (2003) 98(463):750-763.

Trasarti, R. et al., "Mining Mobility User Profiles for Car Pooling," Proceedings of the 17th ACM SIGKIDD International Conference on Knowledge Discovery and Data Mining (2011) San Diego, CA, Aug. 21-14, pp. 1190-1198.

Van Dijk, J. A. G. M. et al., Alter Ego: State of the art on user profiling (2005) Van Der Geest, T. et al., (eds.), , M. University of Twente, The Netherlands, Mar. 15, 154 pages.

\* cited by examiner

METHODS AND SYSTEMS FOR INTERPRETABLE USER BEHAVIOR PROFILING IN OFF-STREET PARKING

TECHNICAL FIELD

Embodiments are generally related to parking management systems. Embodiments are additionally related to the management of off-street parking.

BACKGROUND OF THE INVENTION

Running a successful business means understanding and addressing well the needs of customer. This is true in most business, including those involving off-street car parking business applications. There is a need to understand the behavior of parking users to drive efficiencies into existing and future parking management applications and systems.

Existing parking business applications do include some user profiling capacities, but they are often limited to pre-defined and well known user behaviors frequently observed in reality. For example, parking operators often assume a recurrent profile of users who arrive Friday afternoon and leave Sunday night. Those would correspond to people parking their car for a weekend, so parking operators can target these users by offering them special discount packages or targeted advertising.

The above case involves the situation of user profiles known a priori. Instead, it is expected that other hidden profiles could be discovered automatically from the data in some manner, such as the use of a clustering algorithm. Furthermore, when those new profiles are discovered by a clustering algorithm, there will still be the problem of their easy interpretation. The discovery process should be transparent to the human decision maker; and it should help decision makers understand why certain users have been grouped together and entail an appropriate offer or proposal.

User profiling using a clustering algorithm in a transportation-related analysis system, where profiles can be created, edited, and explored, plus where automatic tags and automatic textual descriptions can help the operator better understand his data is not available nor has been implemented in current parking management systems. Most systems rely on a manual or static definition of a user profile, and do not offer much flexibility around those definitions. Parking (or public transportation user) profiles are usually developed using data surveys, which can be costly and difficult to be performed in an adequate and timely fashion.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved parking management method and system.

It is another aspect of the disclosed embodiments to provide improved user profiling in off-street parking applications.

It is yet another aspect of the disclosed embodiments to provide for the automatic identification of latent user profiles and related information in the context of a parking management system.

It is another aspect of the disclosed embodiments to provide for a method and system for interpretable user profiling for a parking user profiling system.

The aforementioned aspects and other objectives and advantages can now be achieved as described herein. Methods and systems are disclosed for interpretable user behavior profiling in off-street parking applications. To render user profiles easy to interpret by decision makers, a semi-automatic discovery and tagging of user profiles can be implemented. Transaction data from one or more (and geographically close) off-street parking installations can be implemented. An analysis of spatio-temporal behavioral patterns can be implemented based on a representation of any parking episode by a set of heterogeneous features, the use of clustering methods for automatic pattern discovery, an assessment of obtained clusters, semi-automatic identification/tagging of space-temporal patterns, and a user-friendly interpretation of obtained patterns.

While clustering users by their behavior has already been addressed in different applications, such as search engine querying, social networking, the disclosed embodiments are unique in that they address the specific setting where users profiling comes along with the requirement for interpretability for making commercial offers. This approach is particularly applicable for off-street parking setting.

It will be appreciated, however, that the disclosed embodiments can be generalized to any parking environment where it should be possible to reliably determine when the same user entered and exited a parking zone. While this may not be the case for most on-street parking scenarios, this might be the case, for example, if in one specific on-street parking there is a reliable way to know when a user is parked at some place or not.

The disclosed embodiments thus address off-street car parking business applications and management systems, where an understanding of user parking behavior can be achieved by identifying user groups presenting a similar behavior. This similarity of user behavior can be captured in a variety of ways, such as similar recurrent arrival and leave weekdays, making similar journeys and choosing same parking zones. If a user profile is identified correctly, making an appropriate offer or proposing a service will have higher chances to be accepted by the user.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
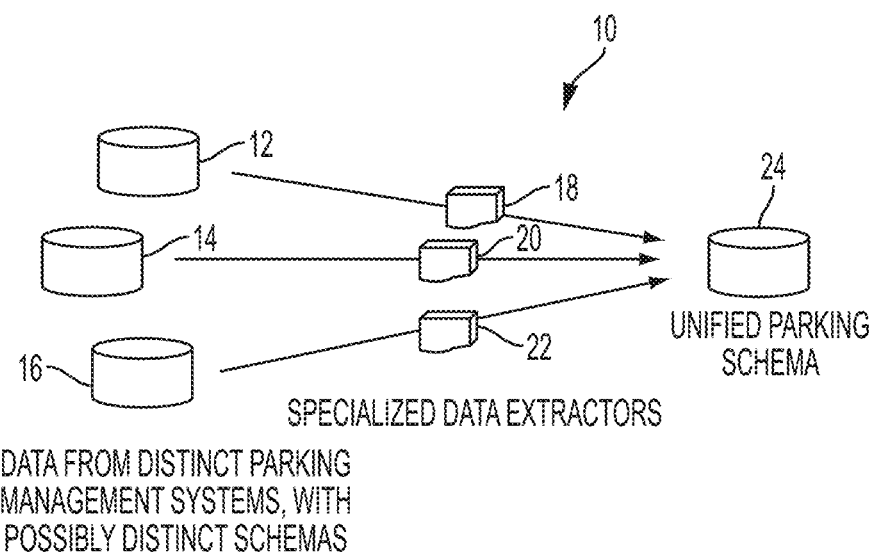
FIG. 1 illustrates a flow diagram depicting a data-extraction and transformation process, in accordance with a preferred embodiment.

The particular values and configurations discussed in these non-limiting examples can be varied and are cited merely to illustrate one or more embodiments and are not intended to limit the scope thereof.

The disclosed embodiments provide for a visualization engine for visualizing parking and traffic data, and also a framework for creating, testing, and exploring data processing techniques in geo-spatial data with ease. The data can be obtained from several sources and can reflect different areas over the world. Some data may be derived, for example, from standalone parking lots, shopping malls, and airports, while other data may be obtained from networks of parking lots covering entire cities or agglomerations.

Given the amount of available data, applying machine learning algorithms to such information is helpful in better understanding the behavior of parking users. The disclosed embodiments thus cover a number of unique features that may assist an operator, such as, for example: 1) analyzing parking lot data, 2) discovering hidden usage patterns in the data, 3) understanding such patterns, and 4) visualizing how databases come from a variety of sources.

In order to handle and process such information consistently, parking data from different places and vendors can be imported under a single, consistent, and extensible schema that is able to track transactional data from all elements composing a parking lot, such as entrance gates, exit gates, parking zones, duration, payment methods, and payment devices that have been used during the payment process.

Note that for example purposes only, a system is described herein in the context of an airport parking. Such a system, however, can be designed to be used in any parking lot context containing multiple parking zones, centered on some point of interest, such as a hospital, a bus or train station or private parking lots for commercial establishments. The discussion of an airport parking scenario herein is presented for illustrative purposes only and is not considered a limiting feature of the disclosed embodiments.

Among the innovations described herein is a process/method/system that a parking operator can use to explore (and store) user profiles with his or her data visualization tool.

In an example embodiment, we can consider a parking lot as a geographical location containing a finite number p of parking zones, entrance and exit gates, and payment terminals. A parking zone is an area destined for car parking containing at least one entrance gate and one exit gate. Gates within the parking lot can either connect a parking zone with the exterior of the parking lot or with another parking zone. Gates can act as payment devices, even if they lead to another zone instead of the parking lot exterior.

Each parking zone can be associated with a pricing policy, although this policy is not unique. Parking zones can differ in several aspects, such as but not necessarily limited or required to: their pricing policy, capacity, proximity to a region of interest (such as the airport), and the presence of different incentives or guidance provided by the parking lot operators on how a user should choose a particular parking zone.

The disclosed embodiments can consolidate distinct data sources under the same schema into a single storage unit. For this, a system can be implemented, which consolidates the distinct gate transitions and payment events with respect to the same user into a single, consolidated parking event entry (i.e., a parking episode). This can be accomplished utilizing a specialized data extractor and event matching created after each different schema from each of the different vendors or clients' databases.

FIG. 1 illustrates a block diagram depicting a data-extraction and transformation system 10, in accordance with a preferred embodiment. System 10 shown in FIG. 1 generally includes one or more databases 12, 14, 16 (e.g., different vendors' or clients' databases) from which data can be retrieved for processing by one or more respective specialized data extractors 22, 20, 18. Data from the data extractors 22, 20, 18 can be transmitted electronically via a unified parking schema 24. Note that the data contained in databases 12, 14, 16 can include data or information from distinct parking management systems, with possibly distinct schemas. Note that an example of a system, which can be employed to implement system 10 of FIG. 1 is the data-processing system 200 shown and described herein with respect to FIGS. 12-13.

Figure 2:
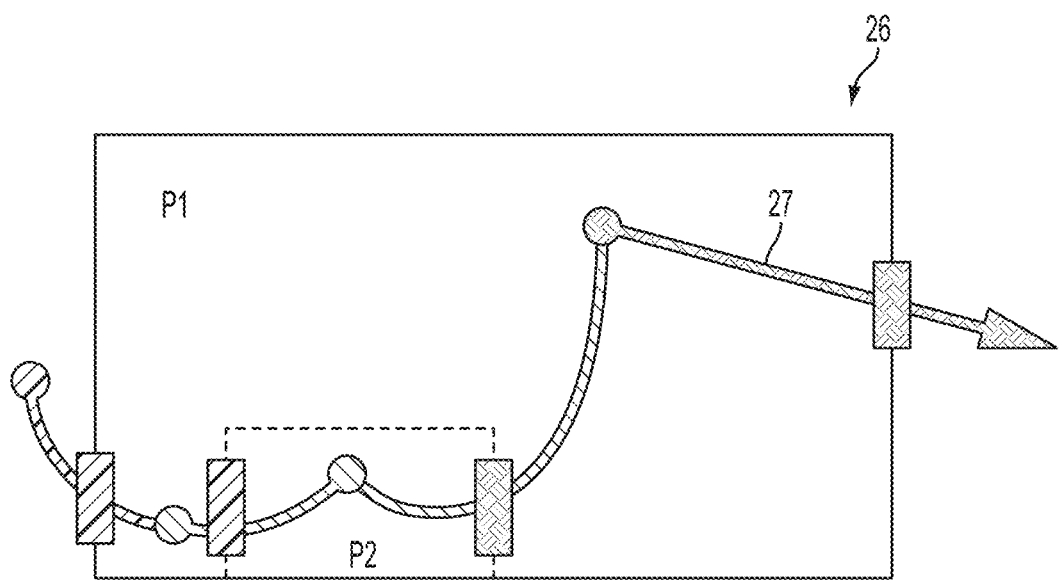
FIG. 2 illustrates a schematic diagram of user movements composing a single parking event, in accordance with an example embodiment.

FIG. 2 illustrates a schematic diagram of user movements composing a single parking event 26, in accordance with an example embodiment. The scenario depicted in FIG. 2 is but one example of the transformation process shown in FIG. 2 with respect to FIG. 1. In the example shown in FIG. 2, a sequence of crossings between entry and exit gates are consolidated into a single history entry. The diagram shown in FIG. 2 indicates a user trajectory within a parking lot containing two parking zones. In this example, zone P2 is contained inside P1. The user enters zone P1, visits zone P2, exits P2 and then finally chooses to park at P1, exiting the parking lot afterwards as indicated by arrow 27.

As in most machine learning tasks, profiling user activities requires extracting features that describe the parking actions and processes in the most complete way. Feature extraction step can be customized by the user, and depending on the user's choice, features can be included or excluded before a clustering algorithm runs with the data.

Below are example features that can be incorporated in a vector of features describing one full parking episode:

$t_a$ the arrival time of the day, for example in fractional hours;

$t_t$ the total parking duration, for example, in fractional hours;

r the revenue that describes how much the user had to pay after retrieving the car;

$w_i$ the arrival day of the week, represented by seven distance variables that measure the modulo distance between the given weekday and each of the seven days of the weeks (those distances can be computed by allocating seven points equally over the 168 hours of the week, and then computing using a distance to a fixed time within the day, such as, the fractional hours in relation to the midnight of every day;

$w_e$ an indicator variable of whether the arrival happened in the weekend;

$d_i$ the modulo distances of a bipolarized week view, in terms of a bi-dimensional vector $\langle d_b, d_w \rangle$ in which $d_b$ contains the modulo distance from the arrival weekday and the middle of the week; and $d_w$ represents the modulo distance from the same arrival weekday and the weekend;

$z_i$ an indicator variable, i=1 . . . p that describes which parking zone of the parking space the user entered first;

$w_p$ an indicator variable indicating whether the parking covered only the weekend (e.g., the car arrived on a Friday afternoon and stood for approximately 2 days); and the modulo distance between the arrival date and two equidistant points of the day such as 6 h and 18 h (which can also be interpreted as transforming the hours into angular data and taking their respective sines and cosines).

Note that among the presented features, some are either redundant or can be computed from others with some effort. Nonetheless, such redundant features may provide different views of the same information and help with clustering approaches discussed in the next sections. Also, note that those are redundant features and may or may not be included in the clustering algorithm(s) or methodologies depending on the user's choice. It should be noted that using redundant features may be harmful for clustering; for this reason, the easily inclusion and removal of features by the system operator for experimental purposes is a key characteristic of the disclosed methods and systems.

Figure 3:
FIG. 3 illustrates a schematic diagram depicting gate message consolidation into a single parking event, in accordance with an example embodiment.
Figure 4:
FIG. 4 illustrates a schematic diagram of an example feature vector describing one parking episode utilized for profiling a parking user in the context of a parking management system, in accordance with an example embodiment.
Figure 5:
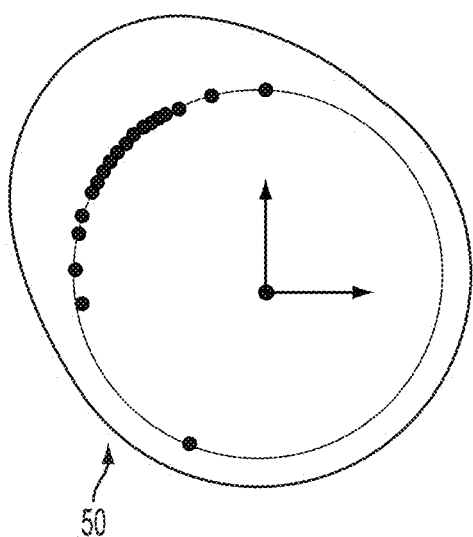
FIG. 5 illustrates a schematic diagram depicting example circular distribution of arrival times, in accordance with an example embodiment.

FIG. 3 illustrates a schematic diagram depicting gate message consolidation into a single parking event 30, in accordance with an example embodiment. FIG. 4 illustrates a schematic diagram of an example feature vector 40 describing one parking episode utilized for profiling a parking user in the context of a parking management system, in accordance with an example embodiment. FIG. 5 illustrates a schematic diagram depicting example circular distribution 50 of arrival times, in accordance with an example embodiment.

FIGS. 3, 4, and 5 demonstrate that some of the temporal variables considered above, such as arrival time and day of the week, have a cyclic nature. Using raw values of cyclic variables is undesirable for no usual distance function can be used. To handle those variables in the clustering along with other features, each circular variable can be decomposed into two components, each of which are ready for use in clustering.

Circular variables can be decomposed into their sine and cosine components and then incorporated into in trigonometric regression. A goal of the disclosed embodiments is to decompose the original variable using a new basis where the usual notion of distance (e.g., such as the Euclidean distance) may apply. Cyclic variables (such as arrival times using this technique) can then be decomposed. However, for days of the week, the data can be decomposed into a different basis, emphasizing the differences between weekends and business days by considering the middle of the week and the middle of the weekend as the new axis in our basis transformation.

Features describing parking episodes presented above are very heterogeneous, containing continuous, binary, and categorical features of distinct natures and units. Thus, the feature vectors are preprocessed, balancing the weights between every feature so they can be properly handled by the unsupervised learning algorithms in the next step.

All clustering algorithm are sensitive to distance measures and feature scales. The presence of even mildly different unit scales in the same vector can cause one feature to have a much higher importance than others, and thus dominate distance computations.

In order to resolve the problem of feature heterogeneity, the features can be transformed into z-scores prior to any processing. After the samples have been transformed into z-scores, the different portions of the feature vectors are assigned different weights.

In the disclosed embodiments, user profiling from parking data can be implemented using, for example: 1) hard-margin clustering algorithms, such as K-Means and Binary Split, and 2) soft-margin algorithms such as Gaussian Mixture Models. To address a high interactivity that may be requested by some platforms and to provide the majority of results on-the-fly, focus can be given to, for example, a K-Means algorithm for the following reasons:

1) K-means, besides being one of the earliest clustering algorithms, is also one of the simplest and well understood algorithms that can provide results with relatively simple computations.

2) K-Means is one of the fastest algorithms in comparison to the most sophisticated, but slower, algorithms.

3) The computational implementation of K-Means in our workflow is tuned to work in a parallelized computation environment. Special initialization heuristics can also be used to improve convergence times, consistency, and result repeatability.

Clustering algorithms and/or modules can be employed to process all parking episodes and split them in a number of partitions. Unfortunately, obtained partitions might not be very useful if they are not comparable. In order to obtain more objectively comparisons of the clustering results, the disclosed embodiments provide distinct performance assessment techniques for clustering. Since a parking event dataset for a highly popular parking lot can be extremely large, the disclosed embodiments also provide approximated methods for this task.

The disclosed system can compute default and/or approximate versions of the Dunn's index, which gives an indication on how well a clustering is based on the minimum/maximum distance between elements of different clusters and the Silhouette score, which is based on how tightly data is grouped within a cluster. The approximations employed may assume that cluster shapes are spherical (although the disclosed embodiments are not limited to spherical cluster shapes). This simplifies the computation of the silhouette statistics leading to fast results, but unfortunately decreases the performance assessment power for this measure. The system's Dunn's index measure, on the other hand, is computed with fewer assumptions, but is only available when the number of features is relatively small. The system uses KD-Trees to accelerate the computation of this measure.

K-Means and many other cluster algorithms assume the number of clusters k is given a priori, either determined through experimentation or by the operator's domain knowledge. However, we can also attempt to determine k systematically using different techniques. One technique is to score different partitions by the Dunn's index or the Silhouette score, and then rank the partitions using a selection criteria such as the Elbow method to determine an optimal number. The system uses a variant of the Elbow method known as the Jump method. The Jump method is based on rate distortion theory and involves selecting the number of clusters according to by how much the distortion changed after a cluster had been added.

Parking operators may wish, for example, to manually define some recurring user behaviors expected in the parking data. In this case, the operator can manually define examples of users that would fit into this profile. This would mean manually filling the relevant clustering features for a usage record with the characteristics pursued.

It can be assumed that the parking operators have a pre-determined user profile for people who perform maintenance tasks in the park every week. Instead of letting the system discover this group of people, the operator would like to relieve the system from this task so it could concentrate into finding other, more interesting groups in the data. As such, the operator might create the following synthetic data representing their work schedule as shown in the example of Table 1 below:

TABLE 1

Synthetic data representing a "maintenance workers" profile

| Entry day of the week | Parking Zone | duration |
| --- | --- | --- |
| Tuesday, 18h25 | Professional Zone 1 | 2 h 30 min |
| Tuesday, 18h00 | Professional Zone 1 | 4 h 15 min |
| Tuesday, 17h25 | Professional Zone 1 | 3 h 10 min |

Afterwards, the feature extraction process such as that shown, for example, in FIG. 1, can transform this data into feature vectors. There are three potential ways the same can proceed. For example, in one embodiment the system can compute the mean feature vector for the given synthetic samples and use this average vector as one of the cluster centroids in the clustering algorithm or module, and the clustering is run as normal. The system preserves the cluster's index so it is still possible to identify which final cluster corresponds to the initial guess. This can be accomplished either for a single one or for multiple a priori profiles.

In a second embodiment, the system can again utilize the vector as one of the initial cluster centroids in the clustering algorithms; however, this centroid is not allowed to change during clustering. Again this can be done for one or multiple a priori profiles.

In a third embodiment, the operator may necessarily specify more than one a priori profile. The operator can then select a classification algorithm or module that supports rejection, such as any distance or probability-based supervised classifier (e.g., Bayesian classifiers, Logistic Regression classifiers, probabilistic Support Vector Machines, etc.). The operator must also select a rejection threshold that can be used to filter entries that do not qualify for any of the a priori profiles defined. Once those two are selected, the system creates an instance of the chosen classifier to separate between the known a priori profiles defined by the user. Once this classifier is created, the system runs this classifier in the entire database. Every instance that could not be classified within the selected rejection threshold is separated from the data. Finally, the clustering algorithm is run only in this separated, still unlabeled data.

As soon as a new profile is identified/assessed, the system can propose tags to further qualify this new group of users. The tagging mechanism functions in a manner similar to the above described mechanism to deal with a priori profiles, but runs once the profiles/partitions have been generated. In this setting, the user first manually defines common templates (e.g., in the same format as shown in Table 1) for behaviors expected in the data and that are believed to be interesting to the parking business. For example, the user can create five templates for a "business" tag and seven templates for the "leisure" tag. Those templates are then stored in the database for later use. The average template for every tag can also be stored to speedup computations.

After the set of tags have been created or updated, the system creates a supervised classifier to learn a mapping between the templates and their associated tags. Once the user creates a new cluster, the system runs this classifier in this cluster, associating every sample with one of the known tags in the system. The system then analyses how many times each tag occurred within the classified dataset and creates a discrete probability distribution reflecting those values. Any tags that occurred more times than would be expected in a uniform distribution are reported to the user, alongside their respective probabilities.

The probabilities can then be used to order and display the tags for the user. Probabilities can be represented as different color shades or different font sizes so it is possible for the user to have an idea how strong a tag is within the dataset. The user can then afterwards choose to select or reject the suggested tag according to his understanding of the user profile found.

Simply extracting user profiles from the data or even tagging then may be of little use if it is not possible to understand and interpret them to the parking operator in a straightforward fashion. In order to help the operator make better informed decisions (and even help in the decision to whether accept or reject a tag as detailed in the previous section), the disclosed method/system can generate a textual description of the clustering data. To accomplish this task, the method/system re-learns the clustering mapping using an interpretation-friendly supervised classifier, such as a decision tree or a grid of logical cases easily understandable by a human.

After clustering is complete, the disclosed method/system can assign a cluster label for every sample in the clustered dataset. In order to extract explanations on why a determined group had been clustered together, the system takes every sample in the clustered dataset and their associated class labels, applies a discrete feature extraction process, and creates k decision trees, one for each cluster. Each tree can be trained to distinguish between all elements belonging to one particular cluster and the remaining portions of the dataset.

A large number of discrete features can be considered in this phase. It is very important to note that those feature extractors must be created not to maximize the classification power of a particular tree, but instead its interpretability. One particular choice of feature extractors can include, for example:

Dividing the total parking duration $t_s$ in discrete categories "Drop", "Short-stay", "One day", "Two days", "Long stay";

Dividing the period of the day into discrete categories "Early morning", "Morning", "Noon", "Afternoon", "Evening", "Night";

Dividing arrival dates into days of the week;

Dividing arrival dates into categories "Weekend", "Workweek";

Dividing arrival and duration information into "Lunch", "Dinner", "Normal time";

Dividing arrival and duration information into "Overnight" and "Same day".

After the trees have been learned, they can then be mapped to sets of Decision Rules. Each rule can then be ranked according to some criteria (e.g., such as their Gini index, entropy, or simply to the number of samples they match in the dataset) and only the top n rules are returned. Accordingly, since those rules also possess antecedent clauses ranked by usefulness (e.g., defined according to the decision tree creation process), we can also choose to keep only the top m antecedents for each rule.

Those rules are then finally written in a textual form and stored in the database alongside the clusters. An example of this technique is shown below, where only the top 3 rules with the top 3 most informative features each are being returned for each cluster:

0=: (Duration==Two days) && (Entry==Night) && (Leave==Night)
1=: (Overnight==Yes) && (Duration==Long stay) && (Arrival==Weekend)
2=: (Overnight==Yes) && (Duration==Long stay) && (Arrival==Workweek)
3=: (Entry==Evening) && (Meal==No) && (Overnight==Yes)
3=: (Entry==Night) && (Leave==Early morning) && (Overnight==Yes)
4=: (Leave==Morning) && (Overnight==No) && (Entry==Early morning)
5=: (Meal==No) && (Entry==Afternoon) && (Overnight==Yes)
6=: (Overnight==Yes) && (Duration==Long stay) && (Day entry==Friday)
7=: (Meal==No) && (Entry==Noon) && (Overnight==No)
7=: (Meal==No) && (Entry==Afternoon) && (Overnight==No)
8=: (Overnight==Yes) && (Duration==Long stay) && (Entry==Evening)
8=: (Overnight==Yes) && (Duration==Long stay) && (Entry==Night)
8=: (Overnight==Yes) && (Duration==Long stay) && (Entry==Early morning)
9=: (Overnight==Yes) && (Duration==Long stay) && (Arrival==Workweek)

In the example above, the first number before each line indicates the profile the line will be referring to. The rules are ordered in terms of importance, as well as their individual antecedent clauses. For example, it is easy to see that, for the first three profiles, one feature that mostly characterizes those is the duration, which could be divided into two days for the first profile, long stay with arrival in the weekend for the second profile, and long stay with arrival in the workdays for the third profile. This is rather different for the fourth profile, whose most discerning characteristic is entering in the parking lot during the night and leaving during early morning.

From here, it is simple to see how those clauses can be easily formatted into human-readable sentences that can then serve as initial descriptions of the clusters found.

Figure 6:
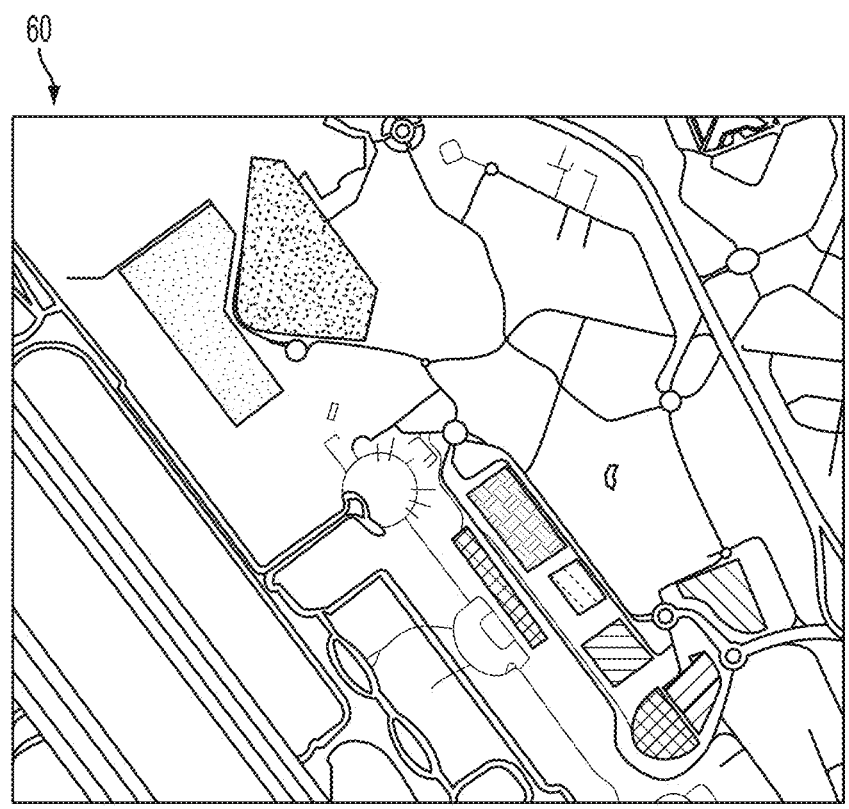
FIG. 6 illustrates a sample map depicting an overview of the Toulouse-Blagnac airport parking zones, in accordance with an example embodiment.

FIG. 6 illustrates a sample map 60 depicting an overview of sample airport parking zones, in accordance with an example embodiment. Note that the sample map 60 shown in FIG. 6 is for illustrative purposes only and is not considered a limiting feature of the disclosed embodiments. Given the amount of available data, applying learning modules to such information can assist in providing a better understanding of the behavior of parking users.

The following sections explore how an operator may view, understand, and visualize usage patterns hidden deeply within parking lot data according to the disclosed embodiments. In one generic airport example, a generic airport may offer, for example, 7 public and 2 reserved parking zones capable of accommodating roughly 9000 cars. The zones can be divided into categories, including a zone for drop-offs, a short-stay zone (P0), two mid-stay zones (P1 and P2), an online booking zone which might open occasionally to mid-stay parkings (P3), two long-stay zones (P5 and P6), and staff only parking zones (Professional and Personnel P4). Table 2 below presents example data regarding such parking zones.

TABLE 2

Example Airport Parking Zones

| | Capacity** | Walking distance | Intended use | Maximum |
|---|---|---|---|---|
| Arret Minute | 58 | 1 min | Drop-off | 10 min |
| Express P0 | 332 | 1 min | Short stay | 3 hours |
| ProxiPark P1* | 2348 | 1 min | Mid stay | — |
| ProxiPark P2 | 2825 | 1 min | Mid stay | — |
| ProxiPark P3* | 200 | 8 min | Mid stay | — |
| EcoPark P5 | 3000 | 20 min | Long stay | — |
| EcoPark P6 | 3000 | 20 min | Long stay | — |
| Personnel P4 | 650 | — | Staff only | — |
| Professionel P | 100 | — | Services only | — |

*parking with support for online booking, distinct pricing rates.
**capacity information may be reflected in a website.

Each parking zone is designed with an intended use in mind. Express P0, for example, may be dedicated to people arriving at the airport to accompany someone who is departing or to greet somebody who will be arriving. With a maximum limit of 3 hours, for example, this zone is also a good fit for people arriving for shopping or eating. Sample parking zones ProxiPark P1 and P2 may be better suited for people who need to park for more than a day, but no longer than two days. Sample parking zone ProxiPark P1 may be located very close to the airport terminal building, but zone P2, on the other hand, may require a walking time of between 6 to 8 minutes. Those zones may not have a maximum time limit.

EcoParks P5 and P6 zones, on the other hand, may be designed for long-term stays. Assuming these zones are located 1.5 km far from the airport, a shuttle may drive to and from the airport every 10 minutes. Those zones may be better suited for people leaving their cars for more than two days, and again there may be no upper limit on the number of hours one can park there.

ProxiPark P3 can be implemented as a hybrid zone that is usually intended for online booking. This zone may be located relatively close to the airport and its places can be reserved through an online booking system. However, this zone may also be open to the general public in case the other parking zones are full. In order to make a reservation, users may be required to park their car for a minimum number of days.

Finally, in this example scenario, there may be two non-public parking zones in the airport. The Professional zone, for example, may be intended for third-party service workers who have arrive to perform or provide a service within the airport. The Personnel zone may also be reserved for airport staff and possibly people working within the airport shops and services offerings.

Figure 7A:
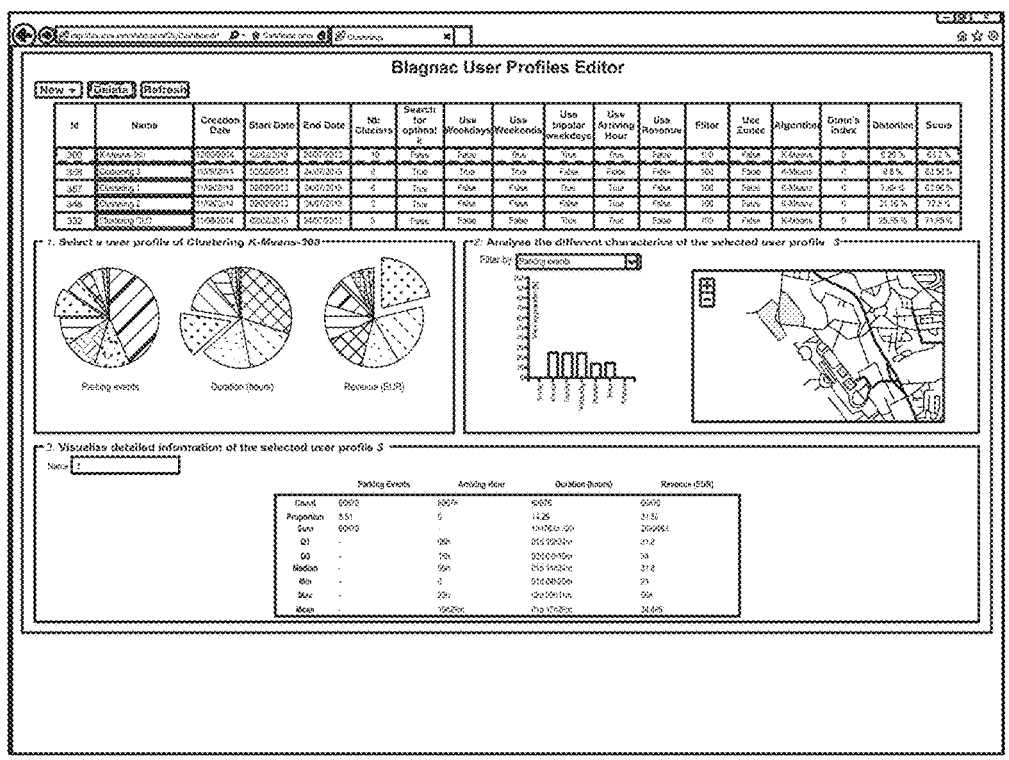
FIG. 7A illustrates a graphical user interface displaying example profiles that can be created utilizing the disclosed user profiling tool, in accordance with a preferred embodiment.

FIG. 7(a) illustrates a graphical user interface displaying example profiles that can be created utilizing the disclosed user profiling tool 72, in accordance with a preferred embodiment. The first step to explore different user profiles in a parking database is to attempt to let the system automatically extract some profiles from the data. For this, the user can be graphically presented with a GUI that provides a Profile Explorer interface, where it is possible to create, remove, edit, and publish user profiles. The profiling tool 72 shown in FIG. 7(a) is one example of a module that can be implemented in the context of such a GUI. With this interface, for example, the user can select and create a new clustering algorithm or module: either letting the system guess initial parameters for his data or by manually overriding those parameters and attempting manual settings.

Figure 7B:
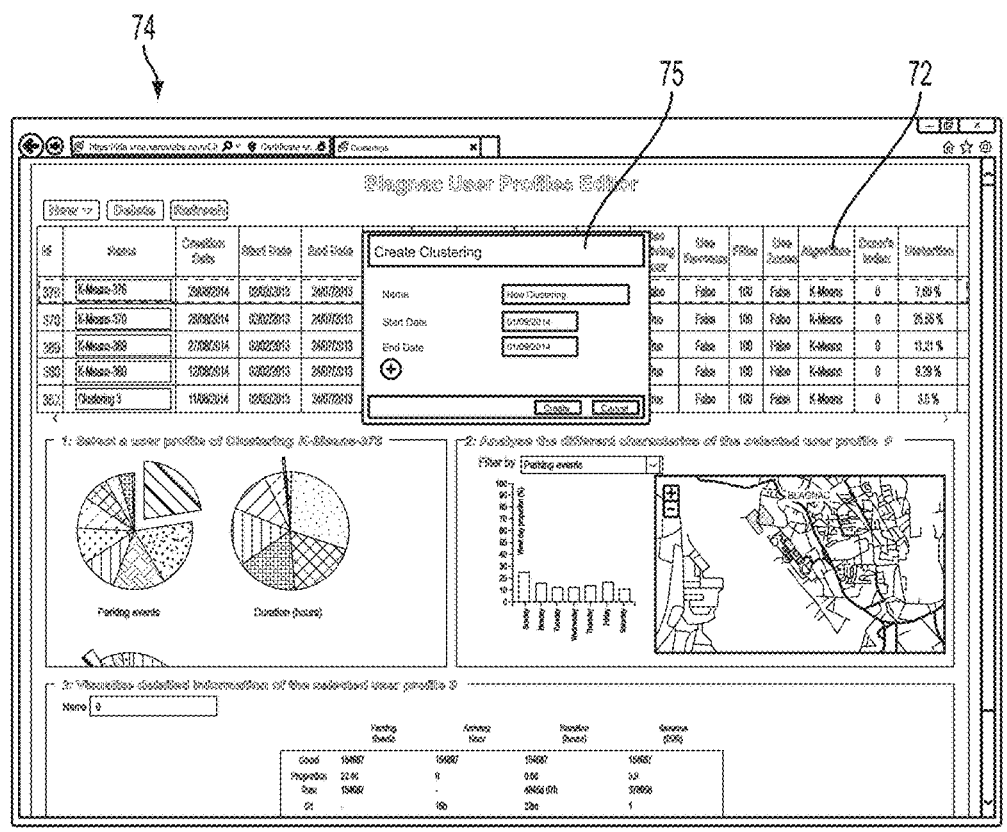
FIG. 7B illustrates a graphical user interface displaying a graphically displayed tool for automatically creating profiles from suggested options, in accordance with a preferred embodiment.
Figure 7C:
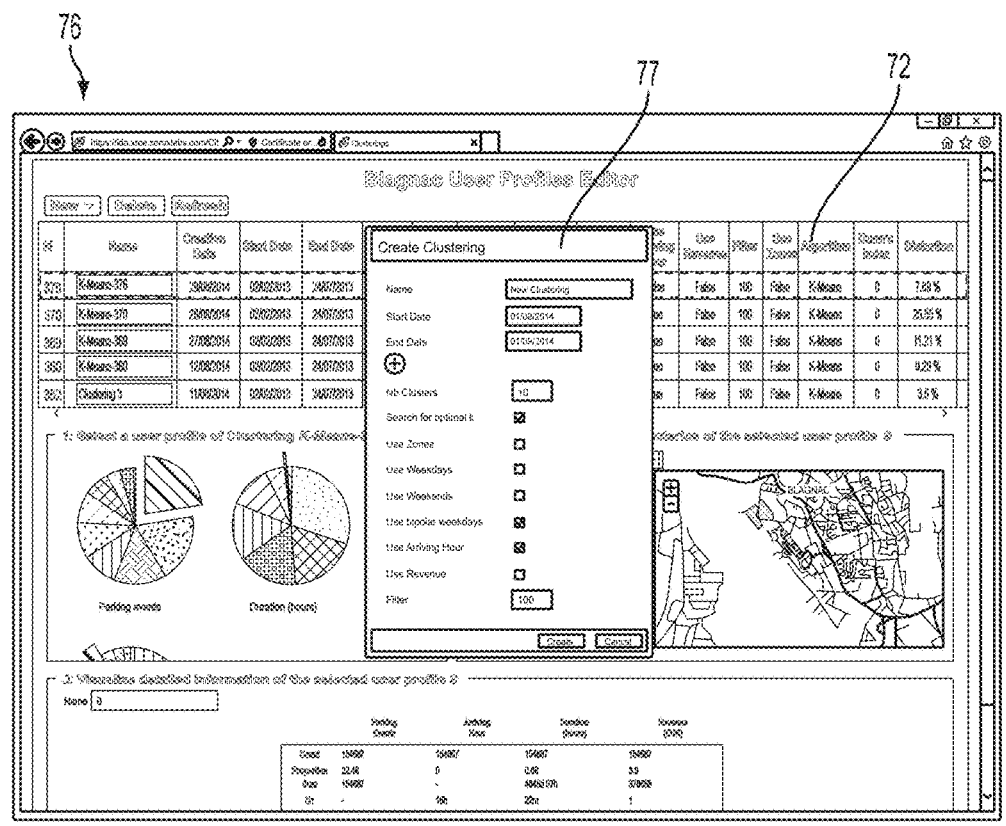
FIG. 7C illustrates a graphical user interface displaying a graphically displayed tool for automatically creating profiles from suggested options, but which can be manually overridden for exploratory purposes, in accordance with a preferred embodiment.

FIG. 7(b) illustrates a graphical user interface displaying the profile tool 72 for automatically creating profiles from suggested options displayable via secondary screen 75, in accordance with a preferred embodiment. FIG. 7(c), on the other hand illustrates a graphical user interface displaying the profiling tool 72 for automatically creating profiles from suggested options, but which can be manually overridden for exploratory purposes via a third screen 77, in accordance with a preferred embodiment.

Figure 8:
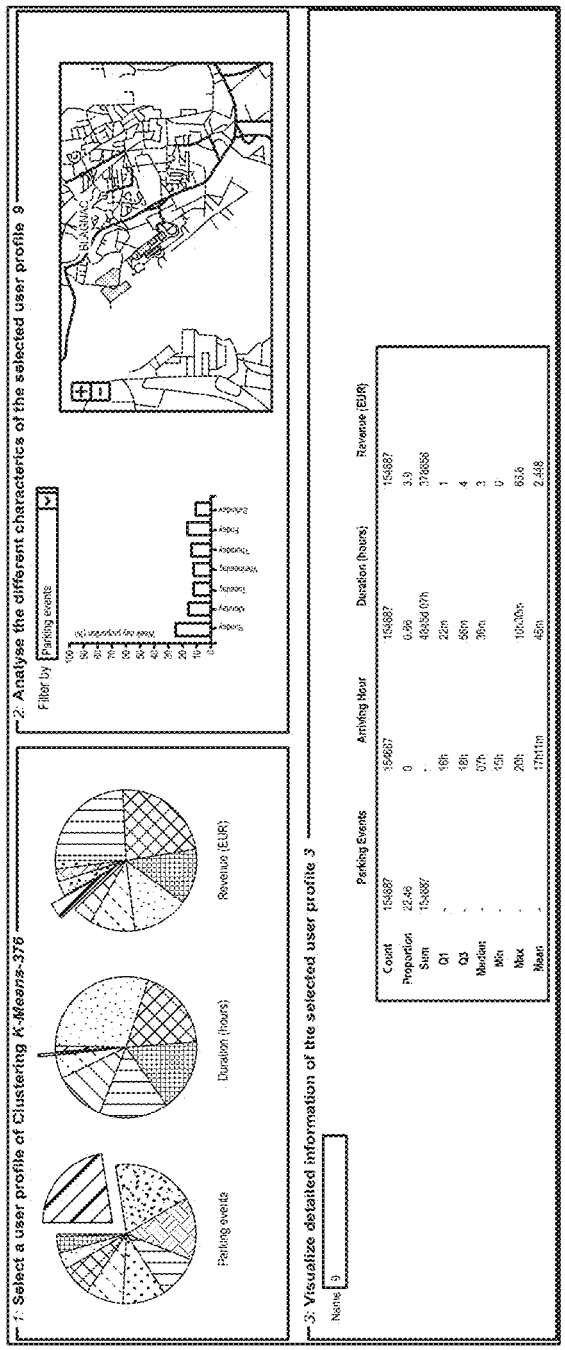
FIG. 8 illustrates a graphical user interface that allows a user to explore different aspects of clustered data, in accordance with a preferred embodiment.

After, profiling results can be decomposed and visualized by different grouping criteria, such as profile, day of the week, and day of the week by profile. Different characteristics can be readily seen in the profile editor, such as number of parking events, generated revenue, and arrival times. Profiles can also be labeled or renamed manually if necessary. FIG. 8, for example, illustrates a graphical user interface 80 that allows a user to explore different aspects of clustered data, in accordance with a preferred embodiment.

Figure 9:
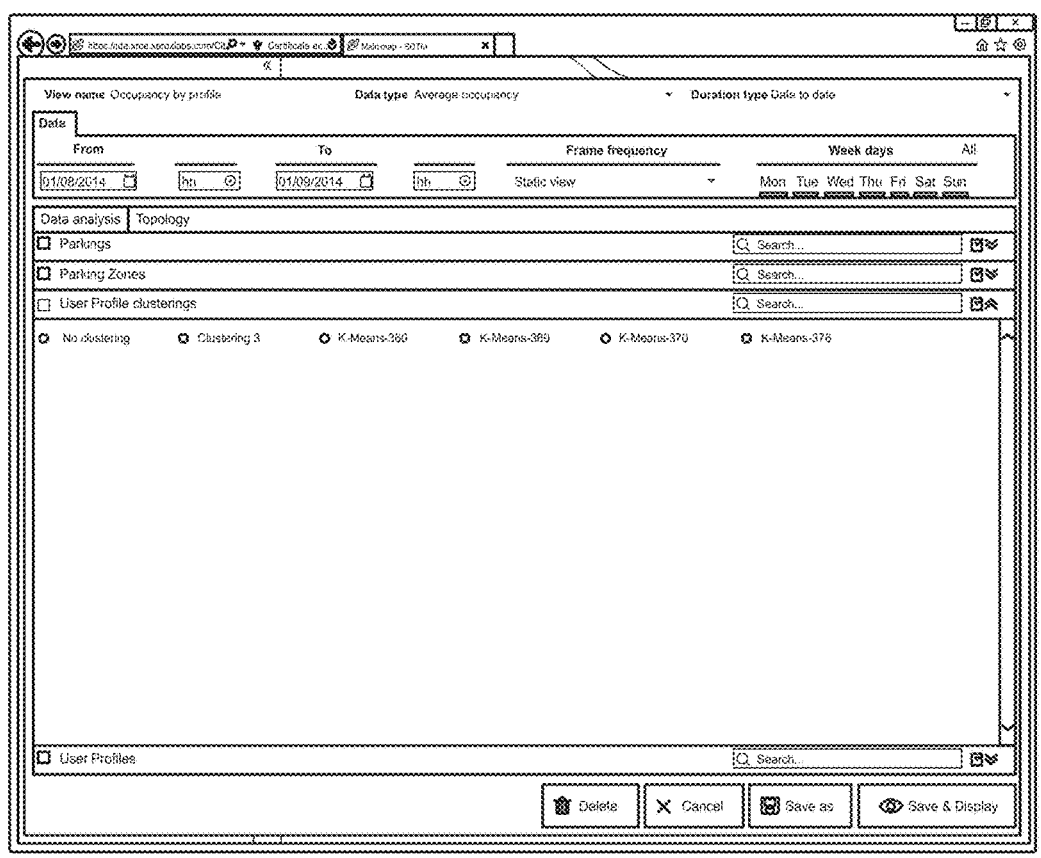
FIG. 9 illustrates a graphical user interface that can be displayed, which allows for the selection of profiling partitioning, in accordance with an alternative embodiment.
Figure 10:
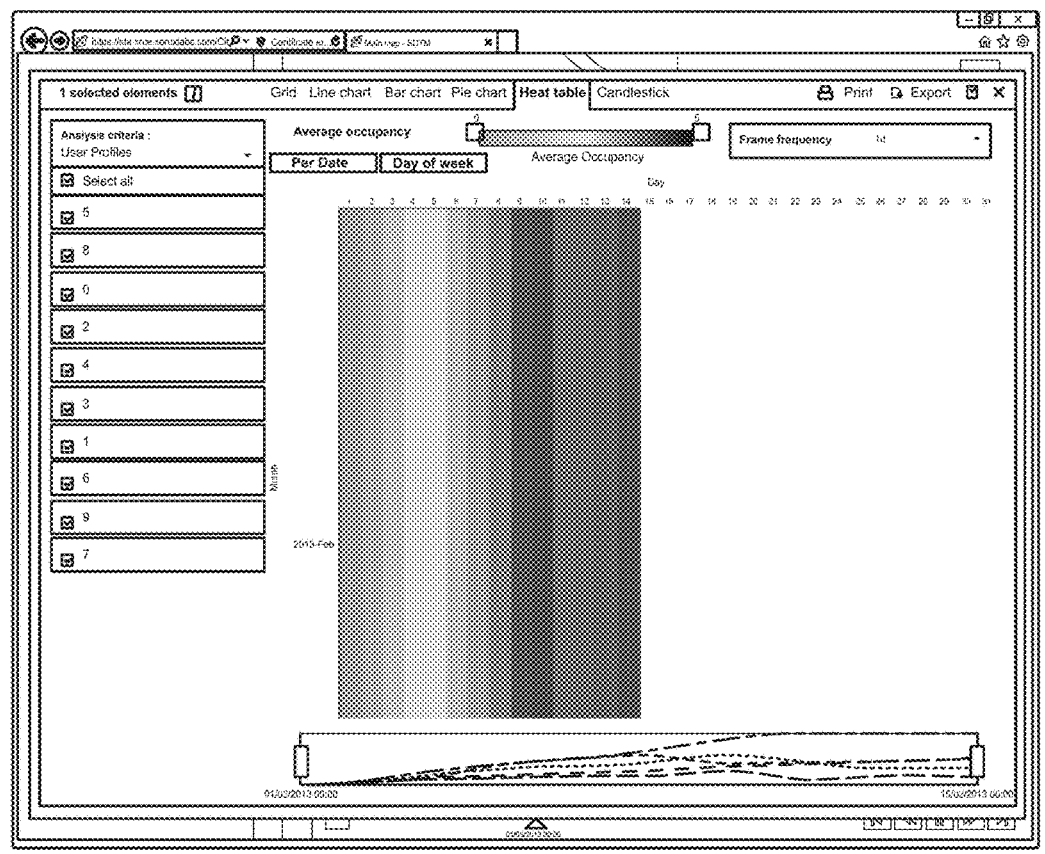
FIG. 10 illustrates a graphical user interface that can visualize the evolution of different user profiles, in accordance with an alternative embodiment.

Afterwards, the multiple clustering views and user profiles can be permanently stored to the database so they can be seen in a geographical/parking data analyzer. The profiles can be integrated and individually seen in any of the previously existing views, such as, for example, an Average Occupancy. FIG. 9 illustrates a graphical user interface 90 that can be displayed, which allows for the selection of profiling partitioning, in accordance with an alternative embodiment. FIG. 10 illustrates a graphical user interface 92 that can visualize the evolution of different user profiles, in accordance with an alternative embodiment.

Figure 11A:
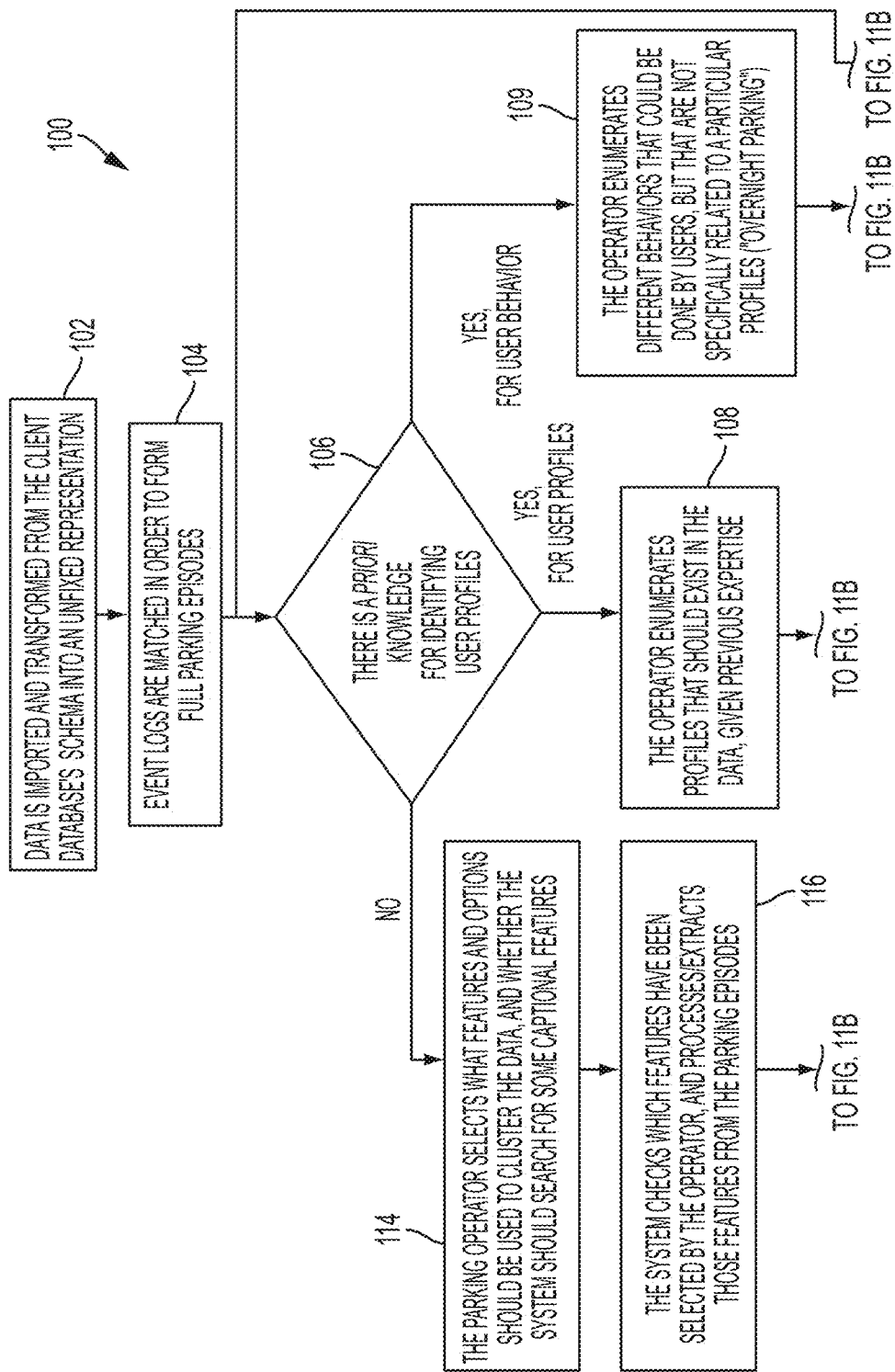
FIGS. 11A-B illustrate a flow chart of operations depicting logical operations of a method for interpretable user behavior profiling in off-street parking, in accordance with a preferred embodiment.
Figure 11B:
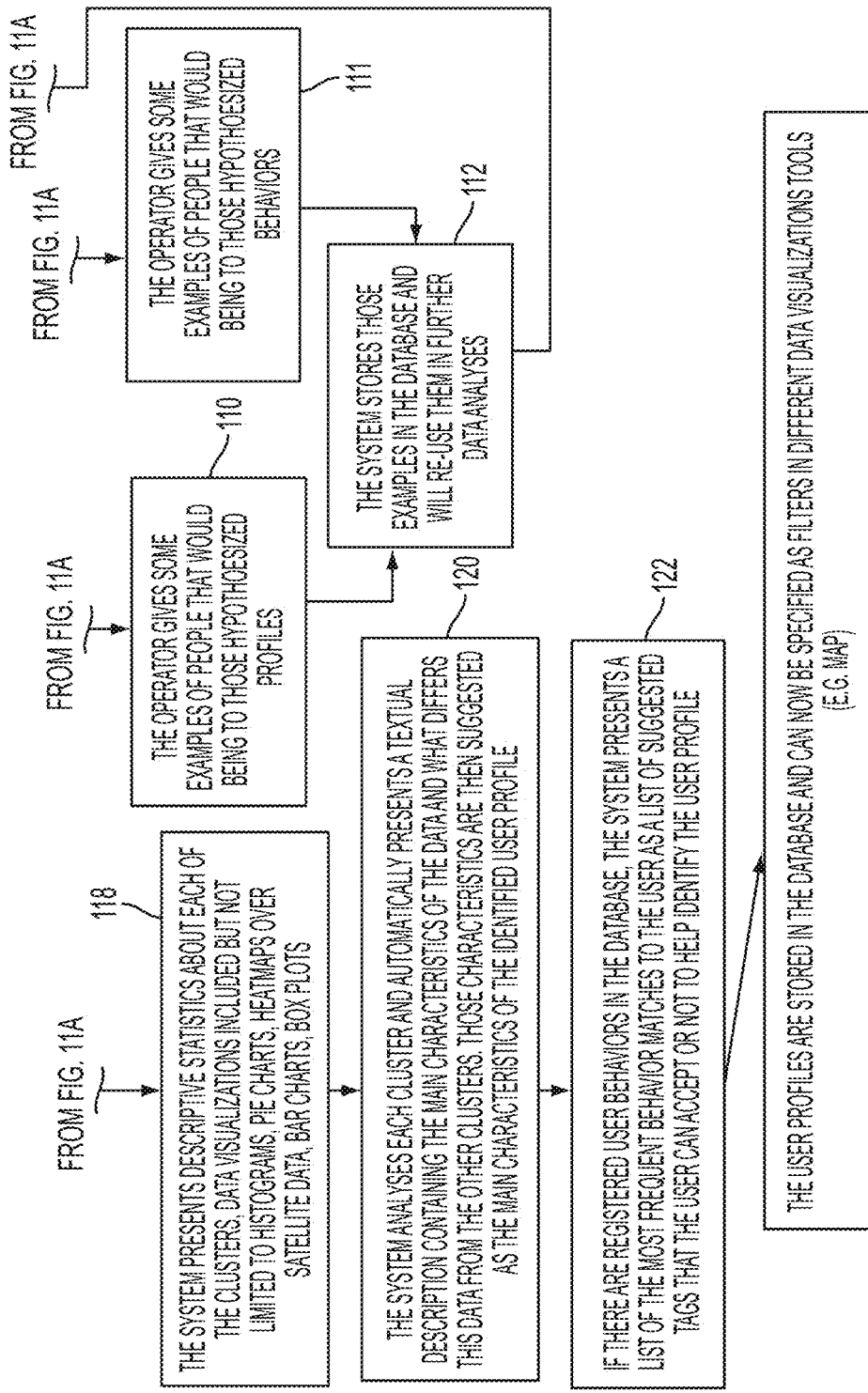

FIGS. 11A-B illustrate a flow chart of operations depicting logical operations of a method for interpretable user behavior profiling in off-street parking, in accordance with a preferred embodiment. As indicated at block 102, data can be imported from the client's database schema into a unified representation. Examples of such databases are databases 12, 14, 16 shown in FIG. 1. Thereafter, as depicted at block 104, event logs can be matched in order to form full parking episodes. Then, as indicated at decision block 106, a test can be performed to determine if there is a priori knowledge for identifying user profiles. If the answer is "Yes, for user profiles," then the steps or operations depicted at blocks 108, 110, and 112 can be processed. If the answer is "Yes, for user behavior," then the steps or logical operations shown at blocks 109, 111, and 112 can be implemented.

As shown at block 108, the operator can enumerate profiles that should exist in the data, given previous expertise. Thereafter, as depicted at block 110, the operation can provide some examples of people that would belong to those hypothesized profiles. Then, as illustrates at block 112, the system (e.g., system 20 shown in FIG. 1) can store those examples in the database (e.g., database 24 shown in system 20 of FIG. 1) and can re-use them in further data analysis.

As depicted at block 109, the operator can enumerate different behaviors that could be implemented by users, but which are not specifically related to a particular profile (e.g., "overnight parking"). Thereafter, as shown at block 111, the operator can provide some examples of people who would present those hypothesized behaviors. Then, the step or logical operation shown at block 112 can be implemented.

Assuming the answer with respect to decision block 106 is "No," then the steps or logical operations of blocks 114, 116, 118, 120, 122, and 124 can be implemented. As indicated at block 114, a step or logical operation can be implemented in which the parking operator selects the features and options that should be used to cluster the data, and whether the system should search for some optimal features. Thereafter, as indicated at block 116, a step or logical operation can be processed in which the system identifies which features have been selected by the operator and processes/extracts those features from the parking episodes.

Next, as described at block 118, the system can present descriptive statistics regarding each of the clusters and data visualizations including, but not limited to, histograms, pie charts, heatmaps over satellite data, bar charts, box plots, and so on. Thereafter, as described at block 120, the system can analyze each cluster and automatically present a textual description containing the main characteristics of the data and what differs or distinguishes this data from the other clusters. Those characteristics can then be suggested as the main characteristics of the identified user profile (e.g., FIG. 7(b) depicts an example GUI in which profiles can be created automatically from suggested options).

As shown next at block 122, if there are registered user behaviors stored in the database, the system can present a list of the most frequent behavior matches to the user as a displayed list of suggested tags that the user can accept (or not), which are helpful in identifying the user profile. The user profiles can then be stored in the database and can now be specified as filters in different data visualization tools, as depicted at block 124.

It can be appreciated based on the foregoing that the disclosed embodiments are directed for methods and systems for overcoming the problems discussed earlier in the background section (e.g., finding profiles, dealing with a priori data, and the profile description). The disclosed approach can deploy a variety of techniques for interpretable user profiling for a parking user profiling system.

The disclosed embodiments thus address the problem of user profiling in off-street parking applications. To make the user profiles easy to interpret by decision makers, a workflow or system can be implemented for the semi-automatic discovery and tagging of user profiles. Such a workflow or system can collect transactional data from one or multiple (geographically close) off-street parking installations.

Within the context of the disclosed methods and systems, an analysis of spatio-temporal behavioral patterns can be implemented based on 1) a representation of any parking episode by a set of heterogeneous features; 2) using clustering methods for automatic pattern discovery; 3) assessment of obtained clusters; 4) semi-automatic identification/tagging of space-temporal patterns; and 5) user-friendly interpretation of obtained patterns.

While clustering users by their behavior has already been addressed in different applications, such as search engine querying, social networking, etc., in the disclosed embodiments, the specific setting is addressed, wherein user profiling is associated with interpretability in making, for example, commercial offers. The disclosed embodiments are particularly applicable for off-street parking situations; hence, the parking terminology discussed herein. It should be appreciated, however, the system and method presented herein can be generalized to any parking environment where it should be possible to reliably determine when the same user entered and exited a parking zone. While this may not be the case for most on-street parking scenarios, this might be the case, for example, if in one specific on-street parking there is a reliable way to know when a user is parked at some place or not.

The disclosed parking lot usage profiling approach disclosed herein includes a number of features. For example, in on embodiment, an automatic user profiling system can be implemented for off-street parking lots, wherein such a system groups together parking users who present a similar behavior. Different user characteristics judged relevant to the creation of a user with a profile can be selected "on-the-fly" by the parking operator through a user interface, such as described above. The disclosed approach generates clusterings (ways the data can be partitioned), and the clusters (data partitions) can be saved in a database and then visualized using the general data visualization tool discussed earlier.

In addition, the number of clusters (profiles) in the data can be automatically determined from the data without user intervention. In some embodiments, the number of profiles can be determined utilizing, for example, the Jump method discussed earlier or other appropriate methodologies. After the clusters are created, the disclosed system can display a statistical analysis of recursively segmented views of the clustered data, such as, for example, analysis per weekday and per parking zone for each segment of users. Additionally, the most prominent characteristics can be extracted by creating a decision tree in the data, transforming this decision tree to a collection of decision rules, simplifying this set of rules, and then transforming those rules to a textual description of the decision function, as discussed earlier.

The disclosed embodiments allow a user to define distinct starting points for the clustering algorithm in terms of templates. A template can be implemented as, for example, a parking record that the user might think is recurrent on his dataset. After defining a template (or a collection of templates), the template(s) can be utilized as starting points (initial centroids in a K-means) of the clustering algorithm to provide the operator more fine control regarding what the unsupervised algorithm should look for.

In another embodiment, the initial points from the clustering algorithm or module that have been defined through templates can optionally be fixed. This approach ensures that the clustering algorithm or module can only cluster points that do not initially belong (or are sufficiently far from) the manually selected user profiles. This technique ensures that the operator can maintain his or her manual profiles in the system, and that the system can automatically search for (sufficiently large) deviations of the manual profiles, discovering new behaviors that the operator did not think of or was unaware of.

In yet another embodiment, the disclosed system can be configured to incorporate a feature that allows operator defined a priori profiles to be performed in two steps. In a first step, the operator can design a collection of synthetic data that follows his expectations for a profile believed to be in the data. This synthetic data can be as simple as a single sample. Afterwards, this synthetic data can be utilized to create a distance-based classifier, such as a minimum mean distance classifier. This classifier must embed a notion of distance or probability for each classification performed. This classifier can then be employed to process the entire dataset. Samples which are farthest or less likely than a fixed distance of probability threshold are then left as unclassified. Finally, the unsupervised clustering algorithm may be run only in the unclassified portion of the data.

In another embodiment, additional information about the user profiles can be gathered from other tools and incorporated into the profile visualizations. An example of such additional information is, for example, the user profile's price elasticity. In yet another embodiment, a feature can be provided that allows an operator to select and/or include (but not restricted to) parameters, such as, for example, a chosen parking zone, indicator variables for each weekday, indicator variables for the weekend, indicator variables for a virtual weekend (starting on Friday's afternoon), weekday (circular), arriving hour (circular), the total amount paid, average amount paid per hour, and so on. Circular variables can be handled in the clustering by transforming such variables to angular variables and incorporating their sine and cosines in the clustering feature vector, as discussed previously.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 12:
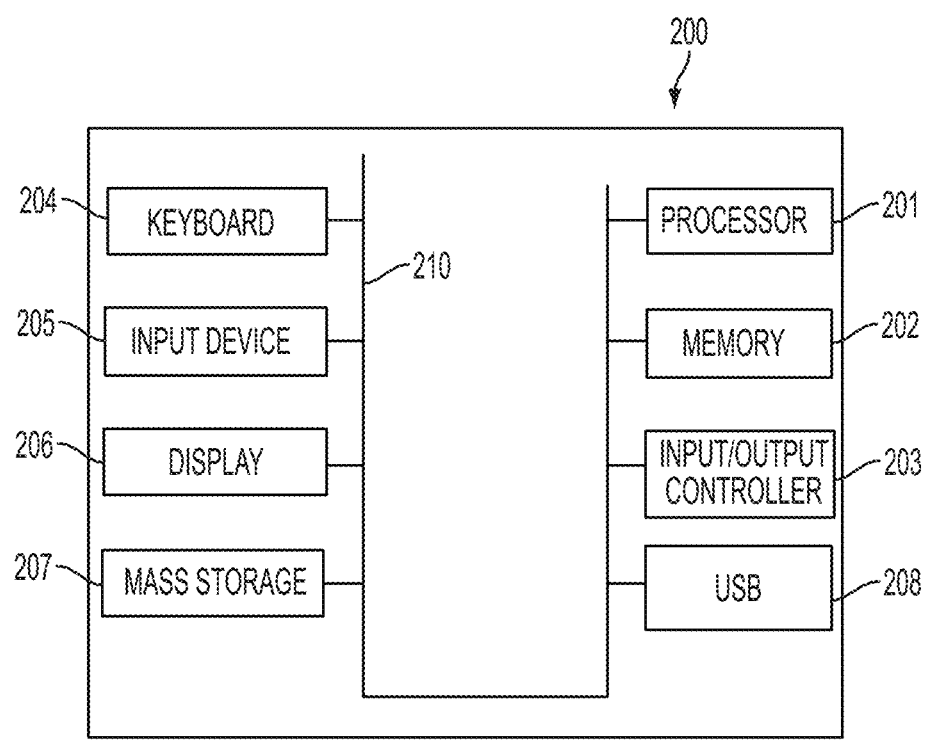
FIG. 12 illustrates a schematic view of a computer system, in accordance with an embodiment.
Figure 13:
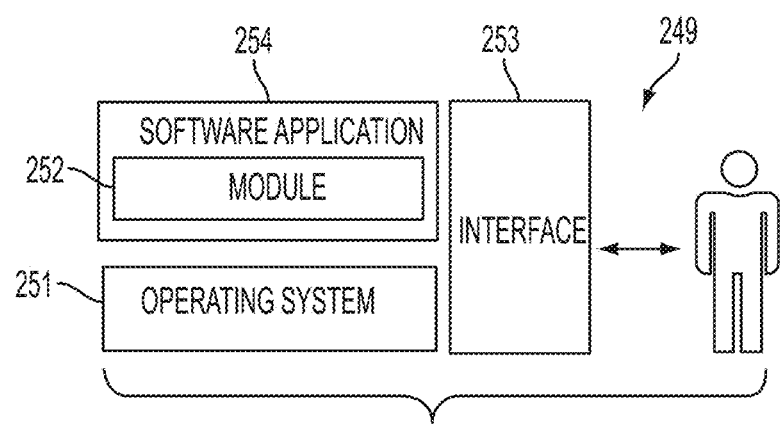
FIG. 13 illustrates a schematic view of a software system including a module, an operating system, and a user interface, in accordance with an embodiment.

FIGS. 12-13 are shown only as exemplary diagrams of data-processing environments in which embodiments may be implemented. It should be appreciated that FIGS. 12-13 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 12, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device, such as a mouse, track ball, pen device, etc.), a display 206, and in some cases, mass storage 207. Data-processing system 200 may be, for example, a client computing device (e.g., a client PC, laptop, tablet computing device, etc.) which communicates with a print server (not shown) via a client-server network (e.g., wireless and/or wired). In some embodiments, the data-processing system 200 may actually be a print server that communicates with one or more printers (not shown).

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device and so on.

FIG. 13 illustrates a computer software system for directing the operation of the data-processing system 200. The software application 254 can be stored, for example, in the memory 202 shown in FIG. 12. The computer software system shown in FIG. 13 generally includes a kernel or operating system 251 and a shell or interface 253. One or more application programs, such as software application 254, may be "loaded" (i.e., transferred from, for example, mass storage 207 or other memory location into the memory 202) for execution by the data-processing system 200. The data-processing system 200 can receive user commands and data through the interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include one or more modules such as module 252, which can, for example, implement instructions or operations such as those depicted in FIG. 11 and described herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 12-13 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A parking lot usage profiling method for improving a parking management system, said method comprising:
    collecting transaction data from at least one off-street parking area utilizing at least one data extractor among a plurality of data extractors;

analyzing said transaction data with respect to spatio-temporal behavioral patterns using machine learning that includes feature extraction with respect to said transaction data collected from said at least one off-street parking area utilizing said at least one data extractor among said plurality of data extractors;

compiling user profiles from said transaction data in at least one database that communicates with said at least one data extractor, in response to analyzing said transaction data with respect to spatio-temporal behavioral patterns with respect to said at least one off-street parking area; and providing a visualization engine for visualizing said user profiles and other data, wherein said visualization engine includes a GUI (Graphical User Interface) for visualizing parking and traffic data and implementing a framework for creating, testing, and exploring data processing techniques in geo-spatial data with ease, said GUI comprising a profiling tool displayed in a secondary screen of said GUI that allows said user to select and create a clustering module, and wherein said profiling tool further automatically creates profiles from suggested options that are capable of being manually overridden for exploratory purposes in a third screen of said GUI, wherein said spatio-temporal behavior patterns include said geo-spatial data and wherein said parking and traffic data include said transaction data, which results in improvements in the functioning of said parking management system and user profiling in off-street parking applications.

2. The method of claim 1 further comprising analyzing said transaction data with respect to said spatio-temporal behavioral patterns based on a representation of any parking episode via a set of heterogeneous features by transforming said transaction data into angular variables and incorporating sine and cosine components thereof in feature vectors.

3. The method of claim 1 further comprising analyzing said transaction data with respect to said spatio-temporal behavioral patterns based on clusters of said transaction data for automatic pattern discovery wherein said clusters are provided by said clustering module.

4. The method of claim 1 further comprising analyzing said transaction data with respect to said spatio-temporal behavioral patterns based on an assessment of obtained clusters of said transaction data, wherein said obtained clusters are obtained from said clustering module.

5. The method of claim 4 further comprising:
analyzing said transaction data with respect to said spatio-temporal behavioral patterns based on semi-automatic identification and tagging of said spatio-temporal behavioral patterns, said tagging including at least one tag associated with at least one template among a plurality of templates.

6. The method of claim 1 further comprising analyzing said transaction data with respect to said spatio-temporal behavioral patterns based on an interpretation of said spatio-temporal behavioral patterns wherein said spatio-temporal behavioral patterns include temporal variables comprising circular variables, wherein each circular variable among said circular variables are decomposed into two components, wherein said two components are used for clustering by said clustering module.

7. The method of claim 2 wherein said GUI allows for selecting via said profiling tool of said GUI, varying user characteristics judged relevant for use in compiling at least one user profile among said user profiles and wherein said feature vectors are preprocessed based on balancing weights between every said feature vector among said feature vectors to that said feature vectors are handled by said machine learning, said machine learning comprising unsupervised learning.

8. The method of claim 3 further comprising:
saving generated clusterings with respect to said clusters in said at least one database, wherein said generated clusterings are generated by said clustering module; and
visualizing said generated clusterings and said clusters via said GUI which includes a graphically displayed data visualization tool that displays said generated clusterings and said clusters.

9. The method of claim 8 further comprising:
automatically determining a number of said clusters from said transaction data without a user intervention; and
displaying a statistical analysis of recursively segmented views of said clusters after said clusters are created.

10. The method of claim 1 further comprising automatically describing at least one of said clusters and said user profile by extracting data from utilizing a user-interpretable data mining/machine learning technique.

11. A parking lot usage profiling system that improves a parking management system, said system comprising:
at least one processor; and
a computer-usable medium embodying computer program code, said computer-usable medium capable of communicating with said at least one processor, said computer program code comprising instructions executable by said at least one processor and configured for:
collecting transaction data from at least one off-street parking area utilizing at least one data extractor among a plurality of data extractors;
analyzing said transaction data with respect to spatio-temporal behavioral patterns using machine learning that includes feature extraction with respect to said transaction data collected from said at least one off-street parking area utilizing said at least one data extractor among said plurality of data extractors;
compiling user profiles from said transaction data in at least one database that communicates with said at least one data extractor, in response to analyzing said transaction data with respect to spatio-temporal behavioral patterns with respect to said at least one off-street parking area; and
providing a visualization engine for visualizing said user profiles and other data, wherein said visualization engine includes a GUI (Graphical User Interface) for visualizing parking and traffic data and implementing a framework for creating, testing, and exploring data processing techniques in geo-spatial data with ease, said GUI comprising a profiling tool displayed in a secondary screen of said GUI that allows said user to select and create a clustering module, and wherein said profiling tool further automatically creates profiles from suggested options that are manually overridden for exploratory purposes in a third screen of said GUI, wherein said spatio-temporal behavior patterns include said geo-spatial data and wherein said parking and traffic data include said transaction data, which results in improvements in the functioning of said parking management system and user profiling in off-street parking applications.

12. The system of claim 11 wherein said instructions for analyzing said transaction data with respect to said spatio-temporal behavioral patterns are based on a representation of any parking episode via a set of heterogeneous features by transforming said transaction data into angular variables and incorporating sine and cosine components thereof in feature vectors.

13. The system of claim 11 wherein said instructions for analyzing said transaction data with respect to said spatio-temporal behavioral patterns are based on clusters of said transaction data for automatic pattern discovery.

14. The system of claim 11 wherein said instructions for analyzing said transaction data with respect to said spatio-temporal behavioral patterns are based on an assessment of obtained clusters of said transaction data, wherein said obtained clusters are obtained by said clustering module.

15. The system of claim 14 wherein said instructions for analyzing said transaction data with respect to said spatio-temporal behavioral patterns are based on semi-automatic identification and tagging of said spatio-temporal behavioral patterns, said tagging including at least one tag associated with at least one template among a plurality of templates.

16. The system of claim 12 wherein said instructions for analyzing said transaction data with respect to said spatio-temporal behavioral patterns are based on an interpretation of said spatio-temporal behavioral patterns wherein said spatio-temporal behavioral patterns include temporal variables comprising circular variables, wherein each circular variable among said circular variables are decomposed into two components, wherein said two components are used for clustering by said clustering module.

17. The system of claim 11 wherein said instructions are further configured for selecting via said GUI, varying user characteristics judged relevant for use in compiling at least one user profile among said user profiles and wherein said feature vectors are preprocessed based on balancing weights between every said feature vector among said feature vectors to that said feature vectors are handled by said machine learning, said machine learning comprising unsupervised learning.

18. The system of claim 13 wherein said instructions are further configured for:
   saving generated clusterings with respect to said clusters in said at least one database, said generated clusterings generated via said clustering module; and
   visualizing said generated clusterings and said clusters via said GUI which includes a graphically displayed data visualization tool that displays said generated clusterings and said clusters provided by said clustering module.

19. The system of claim 18 wherein said instructions are further configured for:
   automatically determining a number of said clusters from said transaction data without a user intervention; and
   displaying a statistical analysis of recursively segmented views of said clusters after said clusters are created via said clustering module.

* * * * *